United States Patent Office 3,378,668
Patented Apr. 16, 1968

3,378,668
METHOD OF MAKING NON-POROUS
WELD BEADS
Allan A. Dolomont, North Haven, Conn., assignor to
Olin Mathieson Chemical Corporation, a corporation of Virginia
No Drawing. Filed Jan. 24, 1964, Ser. No. 339,880
9 Claims. (Cl. 219—74)

ABSTRACT OF THE DISCLOSURE

This invention relates generally to improvements in processing of aluminum welding wire, and more particularly to electrochemical treatment continuously applied to indefinite lengths of material to produce an aluminum welding wire which yields a high quality nonporous weld bead when used in welding components of aluminum articles.

The invention of this application is related to the invention disclosed in co-pending application, S.N. 339,853, filed Jan. 24, 1964, and now abandoned. In that application, which discloses a process for continuously electrocleaning indefinite lengths of aluminum welding wire, it is pointed out in considerable detail that one of the major problems encountered in the use of aluminum welding wire in the metal inert gas process is in the porosity created in the weld bead by hydrogen containing materials which exist in and on the surface of the wire. In certain applications where weld strength is critical and therefore must meet rigid standards, porosity in the weld bead results in articles of substandard and consequently non-acceptable quality. Accordingly, elimination of porosity is a problem of major importance in these fields.

As set forth in the aforementioned co-pending application, the primary contributing source of hydrogen which is the major cause of porosity in the weld bead, is the large expanse of surface area of the welding wires themselves, which are of relatively small diameter (usually smaller than 0.125″), and which are consumed at high rates of speed (up to 1000″ per minute). It is therefore of major concern to this invention to eliminate the two primary sources of hydrogen on the welding wire surface, the first being minute carbon particles which result from furnace cracking of various lubricants used during drawing and annealing. These galvanically active carbon particles, during subsequent storage, act as cathodic stimulators of corrosion, acting as cathodes in small local galvanic cells. These allow aluminum in the presence of moisture to act as an anode and produce an aluminum hydroxide or hydrous oxide film. During subsequent welding, the water in the aluminum hydroxide film breaks down to produce free hydrogen which readily dissolves in the molten metal. Upon solidification, however, the lower solubility of the hydrogen in the solid metal results in the rejection of hydrogen in solution and the production of small voids in the weld.

In addition to the galvanically active carbon particles, the oxide film normally on the wire surface absorbs water to produce a hydrous and hydrated oxide, particularly during long periods of storage, and the subsequent breakdown of these oxides provide additional free hydrogen in the same manner and with the same result as mentioned above.

Considerable improvement in the quality of welds has been achieved by using welding wire which has been subjected to an etching treatment which removes hydrogen containing surface contaminants by removing a considerable amount of surface metal from the wire. This method, however, has been found undesirable due to an inability to control the operation with any degree of accuracy thus creating a high waste factor, and also due to the undesirable surface characteristics which impair the appearance of wire cleaned by this treatment.

In the aforementioned co-pending application, there is disclosed an electrochemical process for thoroughly cleaning the surface of the welding wire to the extent that any remainnig hydrogen containing material or other deleterious contaminants are so negligible as not to be a contributing factor to the creation of hydrogen formed porosity in the weld bead. However, due to the etching effect of the alkaline solution in the first tank of the electrocleaning process, the wire surface is made very rough and uneven, and undesirable in appearance. Therefore, it is frequently desirable not to subject the wire to so thorough a cleaning operation as electrocleaning, but rather to clean it to a commercially acceptable extent, and then cover the wire with a very thin oxide film which both protects the wire surface against further corrosion by contaminants remaining in the wire surface, and also provides high resistance to hydration during subsequent long periods of storage. In one aspect of this invention therefore, the wire is conventionally cleaned by any of a number of degreasing solvents known in the art, after which the wire is subjected to an acid bath electropolishing operation in which the wire is made the anode in an electric circuit in order to cause formation of the protective oxide coating. Similar results are obtained, as pointed out in more detail hereinafter, by electropolishing in an alkaline solution in which metal removal by electroetching is substantially retarded by operating at a high anodic current density in a relatively weak solution.

In another aspect of the invention, since electropolishing in an acid solution has little or no ability to remove grease or lubricants from the wire, a higher degree of contaminant removal than that obtained by commercial solvent degreasing is achieved by a combination of the electrocleaning process described in the above mentioned co-pending application and an electropolishing process with the result that in a continuous operation the as drawn wire is first cleaned of all galvanically active impurities and hydrogen containing materials, after which it is smoothed and coated with a hydration resistant oxide which protects the wire against corrosion almost indefinitely.

Since the oxide coatings are dielectric, and since the electric power for the welding arc must go through the oxide film, it is essential that the coatings be relatively thin and uniform in resistance from coil to coil. Electropolishing as a means of providing such a coating to aluminum welding wire can be accurately controlled and can therefore achieve a highly uniform and good quality product.

Accordingly, it is an object of the present invention to provide a method of treating continuously moving aluminum welding wire which yields high quality non-porous weld beads.

It is another object of the present invention to provide a method of treating continuously moving aluminum welding wires in which the wire is rendered relatively free of porosity forming contaminants and is simultaneously provided with a non-hydratable corrosion resistant coating.

It is yet another object of the present invention to provide a method of treating continuously moving aluminum welding wire in which hydrogen containing contaminants are materially reduced or substantially eliminated by one type of electrochemical action followed by the disposition of a highly corrosion resistant oxide coating by a different electrochemical action.

It is a still further object of the present invention to provide a method of treating continuously moving aluminum welding wire which substantially eliminates the necessity for etching in alkaline solutions and the undesirable surface characteristics resulting therefrom.

These and other objects of the present invention will become more apparent from a consideration of the following detailed description.

In one of its broader aspects, the objects of this invention are achieved by continuously immersing the aluminum welding wire in a first aqueous acid solution containing an anode strip, continuously immersing the wire in a second aqueous acid solution containing a cathode strip, applying an electric current to the strips as the wire passes through the respective solutions, rinsing the wire, immersing the wire in an acid oxidizing solution, again rinsing the wire, and drying the wire.

The invention is directed toward improving the welding characteristics of aluminum welding wires falling within certain categories of aluminum alloys. One group of alloys which is highly suitable for welding wire is the aluminum-iron-silicon group containing aluminum from 99.30% to 99.99%, balance impurities normal for this group, of which the 1000 and 1100 series of alloys are representative. Another group is the 2000 series containing from 3% to 7% copper, 0.1% to 0.5% manganese, .05% to 0.5% titanium, balance aluminum plus impurities normal for this group. Another group is the 4000 series containing 3% to 14% silicon, either with or without 3% to 6% copper, balance aluminum plus normal impurities. And still another group is the 5000 series containing from 2% to 7% magnesium, balance aluminum plus normal impurities.

In accordance with the practice of this invention, a suitable supply of any of an aluminum welding wire made from any of the foregoing alloys is taken as received from the draw bench and suitably coiled, and is conveniently mounted at one end of the processing apparatus in position to be withdrawn from the spool and continuously passed through a plurality of tanks containing the processing liquids which may conveniently be arranged in tiers for efficient utilization of space, the wire to be thereafter drawn through suitable drying apparatus and rewound. In a preferred embodiment of the invention, the wire is guided into a first tank containing an acid solution consisting of sulfuric acid, phosphoric acid, or a mixture of the two, and water, the first tank also containing an anode strip. The wire is then guided out of this tank and into a second tank containing a similar, but not necessarily identical, acid solution and a cathode strip. Upon the application of power the wire is made cathode in the first tank and anode in the second tank, this arrangement facilitating the wire being made part of the electric circuit without the necessity of any direct or mechanical contact between the moving wire and stationary contact strips or brushes which might mar the surface of the wire or otherwise adversely affect its appearance. The wire being cathodic in the first tank has no material effect upon the processing of the wire; the arrangement merely facilitates the carrying of current into the wire in the electric circuit.

Subsequent to anodic treatment in the second tank, the wire is passed through another tank containing a suitable rinse solution such as cold water. Wires made from alloys having relatively large amounts of silicon and copper, such as alloys 2319 and 4043, are then passed into a tank containing an acid oxidizing solution such as nitric acid with 6% hydrofluoric acid to remove smut which is left on the wire surface resulting from the electropolishing treatment of these wires. Following the acid oxidizing bath, these wires are again rinsed in cold water and then dried by hot air blast and suitably coiled or spooled.

Other wires made from low silicon and copper content alloys, such as 5356, which do not acquire smut during electropolishing, are passed directly from the water rinse following anodic treatment to the drying apparatus.

With regard to differences between the first and second acid solutions, it should be noted that the first acid solution may consist of any salt solution or acid solution which will carry the current. In practice, however, the first tank usually contains a solution that is similar to, or at least contains no ions which would be foreign to, the second solution which is of prime importance in the electropolishing operation. Thus, if a phosphoric-sulfuric acid solution is used as the electropolishing solution in the second tank, a solution of phosphoric acid, sulfuric acid, or a mixture of the two, is used in the first tank. Similarly, in the case of other electropolishing electrolytes more fully described below, the first tank would contain solutions of the same ions but not necessarily at the same concentrations. Since the only purpose of the first tank is to avoid the necessity for mechanical contact for the passage of current into the wire, the only real requirement for the electrolyte in the first tank is that it be highly conducting in order to avoid resistance losses, and compatible with the ingredients in the second or electropolishing tank. The compatibility is important because of the high likelihood of carry-over from the first tank into the second.

The electropolishing solutions to which the wire is subjected may be of any of a variety of compositions, including many concentration combinations of the phosphoric and sulfuric acids mentioned above, as well as phosphoric, sulfuric and nitric acid combinations, phosphoric, sulfuric and chromic acid combinations, hydrofluoric, chromic and sulfuric acid combinations, and some alkaline electropolishing solutions such as sodium carbonate and trisodium phosphate. Within this variety of compounds from which the electropolishing solutions can be made up, percentages of the various constituents may vary to suit the needs of particular circumstances depending upon the nature of the alloys selected for the welding wire and the extent of metal which must be removed and/or oxide coating deposition that is desired. In general, good coating oxides are achieved with solutions having a titratable acidity in the range corresponding to concentrations from 40% to 95% sulfuric acid. A preferred solution in the second tank which has been found to yield good quality welding wire is phosphoric acid 45%, sulfuric acid 45% with 10% water. However, this may range from as much as 40% to 80% phosphoric acid and 4% to 45% sulfuric acid plus the addition of other acids such as chromic in concentrations of 0.2% to saturation, and nitric in concentrations from 0.1% to 5%. While it has been determined that the temperature at which the bath is maintained is not critical, excellent results are achieved by operating the solution within the temperature range of 60° C. to boiling point of the solution. The preferable temperature depending upon the alloy of the welding.

While a resident immersion time ranging in the order of 2 seconds to 5 minutes has been found to be operable in achieving a desirable oxide coating effect on the wire, an immersion time of 5 to 40 seconds with a fairly concentrated solution and high operating temperature facilitates the arrangement of an efficient and high productive capacity apparatus for performing the process of this invention.

Anodic current densities are applied in the range well known in the art for commercial electropolishing operations and vary depending upon the solutions selected, and the amount of metal removal which is desired in a particular situation. Generally, current densities will run in the range of 25 to 1000 amps per square foot with an optimum for the above mentioned preferred solution being at about 1000 amps per square foot. The voltage at which the current is impressed also varies depending upon the distance between the electrodes, the electrolyte concentration and electrolyte temperature. Voltages vary within the range of about 7 to 25.

As indicated above, the effect of the wire being cathode in the first tank is merely to provide a convenient way of inserting the wire in the electrical circuit without the necessity for any mechanical contact with the wire. Although hydrogen is evolved, very little if any electrochemical change with respect to the wire takes place in the first tank. In addition, since the acid solutions mentioned above have substantially no grease dissolving ability, the wire must be relatively clean and free of lubricants as a prerequisite to the electropolishing operation. Therefore, the major electrochemical changes which occur on the wire take place in the second or anodic acid bath; in this bath the electro-treatment removes any cathodic stimulators which may remain on the wire following the degreasing or other cleaning process to which the wire must be subjected prior to electropolishing. In addition, the combination of the acid solution electro-treatment leaves a thin film of aluminum oxide on the metal surface. While this film is very thin, it is nevertheless quite anhydrous and, like the high temperature forms of anhydrous alumina, is very slow to hydrate. The film does not interfere with the passage of current into the wire during welding even though it is of dielectric compatibility providing it is maintained sufficiently thin so as to present a low electrical resistance, and is maintained uniform from coil to coil.

Evaluation of wire treated as described above after long term exposure to high humidity atmospheres shows that this treatment provides a surface which is extremely resistant to hydration and/or corrosion. Samples which have been exposed to 100° F. at 95% relative humid conditions for as long as 60 days still produce welds exhibiting little or no porosity. The treated wires are exceedingly bright and have an attractive appearance and the processing is one which readily lends itself to a high degree of efficiency and susceptibility of control.

The following are examples of the practice of this invention and are to be deemed purely illustrative and not all inclusive.

EXAMPLE I

A sample of aluminum welding wire fabricated from alloy 5356 was suitably mounted in coil form on the electropolishing apparatus and was continuously passed through an aqueous solution of 15% sulfuric acid and water contained in a first tank having an anode strip suitably mounted therein. The wire was withdrawn from this tank and immersed in a second solution containing 45% phosphoric acid, 45% sulfuric acid, and 10% water contained in a second tank having a cathode strip. Both solutions were maintained at a temperature of 100° C. with a current density of 1000 amps per square foot applied to the anode. After withdrawal from the second tank, the wire was passed through a cold water rinse, dried by hot air blast and recoiled. The wire was passed through the various solutions at a rate of 30 feet per minute yielding a resident time of 7 seconds in each of the acid baths. The treated wire was found to yield porosity free welds after storage in atmospheres of 95% relative humidity at 100° F. even after periods of 30 to 60 days exposure.

EXAMPLE II

A sample of aluminum welding wire fabricated from alloy 4043 was mounted on the electropolishing apparatus and treated in the manner described above for alloy 5356 with the exceptions that the solutions were maintained at a temperature of 70° C., and the wire was passed through a nitric acid oxidizing rinse followed by a cold water rinse before being dried. Good results as indicated above were obtained.

EXAMPLE III

A sample of aluminum welding wire fabricated from alloy 2319 was treated in a manner similar to that described for Example I with the exceptions that the electropolishing solution in the second tank consisted of 45% phosphoric acid, 45% sulfuric acid, 10% water to which was added enough chromic acid to provide a saturated solution; the solutions were maintained at 70° C., and the wire was subjected to the same nitric acid rinse as was the sample from alloy 4043. Good results were obtained.

In regard to the aforementioned degreasing treatment which must precede the electropolishing operation, a number of alternatives are suitable for accomplishing the desired result. The wire may be conventionally degreased using commercial solvents such as trichloroethylene, perchloroethylene or other chlorinated or oxygen containing hydrocarbons which are effective in removing the bulk of the drawing lubricants, but which fail to have an effect upon the small percentage of animal fats such as lard oil which must be removed by saponification or etching of the metal. Such treatment usually requires a number of dipping and rinsing operations, and is therefore time consuming and not economically desirable.

A faster and more effective method is caustic etching in hot sodium hydroxide or other highly caustic solutions which remove all contaminants; this treatment, however, suffers the disadvantage of removing a considerable amount of surface metal and leaving a discolored and uneven surface appearance on the wire.

A preferred alternative is to employ the electrocleaning process substantially as described in the above identified co-pending application, and it is a feature of this invention that the electrocleaning and electropolishing processes be combined into a single continuous electro-treating operation.

In accordance with this aspect of the invention, a suitably spooled supply of wire is mounted on apparatus conveniently arranged for continuously treating the moving wire, and the wire is drawn through a first tank of alkaline electrocleaning solution containing an anode strip and then through a second tank of similar alkaline electrocleaning solution containing a cathode strip. In these two tanks the wire is degreased and thoroughly cleansed of all cathodic stimulators and hydrogen containing materials in the manner substantially as described in the aforementioned co-pending application. The wire is then passed through a rinsing solution, and then through an oxidizing acid solution to remove any remaining concentrated alkaline solution.

After being passed through a suitable rinse from the neutralizing acid bath, the wire is passed into the two above described electropolishing solutions, being again cathodic in the first tank and anodic in the second tank so as to achieve the desired deposition of a highly moisture resistant oxide coating. Following another suitable rinse the wire is dried and recoiled.

It will be observed that in this process the wire is part of two individual electric circuits, one in the electrocleaning step and the other in the electropolishing step. While this arrangement is but a preferred means of achieving the objects of the invention and is not essential thereto, and while it is contemplated that various arrangements may be made utilizing single tank electrocleaning and electropolishing operations, such arrangements require more elaborate direct or mechanical facilities for establishing the proper electrical connections in order to make the wire anodic in each of the electroprocessing steps. Therefore, the double tank procedure in each of the electro-processing steps is preferred since it greatly facilitates the arrangement of apparatus for continuously processing the wire.

It will be apparent from the foregoing description that there has been provided a method of treating aluminum welding wire which is believed to provide a solution to the foregoing problems and achieve the aforementioned objects. It is to be understood that the invention is not limited to the examples described herein which are deemed to be merely illustrative of the best modes of carrying out the invention, but rather is intended to encompass all such modifications as are within the spirit and scope of the invention as set forth in the appended claims.

What I claim and desire to secure by Letters Patent is:

1. A method of making a high quality non-porous aluminum weld bead comprising the steps of:
   (A) providing an indefinite length of continuously moving aluminum welding wire,
   (B) continuously passing said wire through a first aqueous acid solution containing an anode electrode, said anode electrode being spaced from said wire by said first solution,
   (C) continuously passing said wire through a second aqueous acid solution containing a cathode electrode, said cathode electrode being spaced from said wire by said second solution,
   (D) applying an electric current to said electrodes as said wire passes through said solutions whereby said wire is cathodic in said first solution and anodic in said second solution, wherein the residence time in said solutions is from 2 seconds to 5 minutes,
   (E) rinsing said wire, and
   (F) drying said wire,
   (G) and welding with said wire to provide high quality, non-porous weld beads.

2. A method of making a high quality non-porous aluminum weld bead comprising the steps of:
   (A) providing an indefinite length of continuously moving aluminum welding wire,
   (B) continuously passing said wire through a first aqueous acid solution having a titratable acidity equivalent to sulfuric acid concentrations ranging from 40% to 95%, said solution containing an anode electrode which is spaced from said wire by said solution,
   (C) continuously passing said wire through a second aqueous acid solution having a titratable acidity equivalent to sulfuric concentrations ranging from 40% to 95%, said solution containing a cathode electrode which is spaced from said wire by said solution,
   (D) applying an electric current to said electrodes as said wire passes through said solutions whereby said wire is cathodic in said first solution and anodic in said second solution, said current having a current density in the range in which cathodic stimulators of corrosion are removed from said wire and a relatively thin coating of aluminum oxide is formed thereon, wherein the residence time in said solutions is from 2 seconds to 5 minutes,
   (E) rinsing said wire, and
   (F) drying said wire,
   (G) and welding with said wire to provide high quality, non-porous weld beads.

3. The method as set forth in claim 2 further including the steps of
   (A) immersing said wire in an acid oxidizing solution subsequent to said rinsing, and
   (B) thereafter rinsing said wire.

4. The method of claim 2 wherein said first and second solutions are aqueous acid solutions containing a material selected from the group consisting of phosphoric acid, sulfuric acid, chromic acid, hydrofluoric acid, nitric acid and mixtures thereof.

5. The method of claim 2 wherein said solutions are maintained at a temperature within the range of 60° C. to the boiling point of said solutions.

6. The method of claim 2 wherein said current density is within the range of 25 to 1000 amps/sq. ft.

7. A method of making a high quality non-porous aluminum weld bead comprising the steps of:
   (A) providing an indefinite length of continuously moving aluminum welding wire,
   (B) continuously passing said wire through an aqueous acid solution containing a cathode electrode which is spaced from said wire by said solution,
   (C) applying an anodic electric current to said wire as said wire moves through said solution, wherein the residence time in said solution is from 2 seconds to 5 minutes,
   (D) rinsing said wire, and
   (E) drying said wire,
   (F) and welding with said wire to provide high quality, non-porous weld beads.

8. A method of making a high quality non-porous aluminum weld bead comprising the steps of:
   (A) providing an indefinite length of continuously moving aluminum welding wire,
   (B) continuously passing said wire through an aqueous alkaline solution containing a cathode electrode which is spaced from said wire by said alkaline solution,
   (C) applying an anodic electric current to said wire as said wire moves through said alkaline solution,
   (D) rinsing said wire,
   (E) continuously passing said wire through a passivating and neutralizing acid solution,
   (F) rinsing said wire,
   (G) continuously passing said wire through an aqueous acid solution containing a cathode electrode which is spaced from said wire by said acid solution,
   (H) applying an anodic electric current to said wire as said wire moves through said acid solution, wherein the residence time in said solution is from 2 seconds to 5 minutes,
   (I) rinsing said wire, and
   (J) drying said wire,
   (K) and welding with said wire to provide high quality, non-porous weld beads.

9. A method of making a high quality non-porous aluminum weld bead comprising the steps of:
   (A) providing an indefinite length of continuously moving aluminum welding wire,
   (B) continuously passing said wire through a first aqueous alkaline solution containing an anode electrode, said anode electrode being spaced from said wire by said first solution,
   (C) continuously passing said wire through a second aqueous alkaline solution containing a cathode electrode, said cathode electrode being spaced from said wire by said second solution,
   (D) applying an electric current to said electrodes as said wire passes through said alkaline solutions whereby said wire is cathodic in said first alkaline solution and anodic in said second alkaline solution,
   (E) rinsing said wire,
   (F) passing said wire through a passivating and neutralizing acid bath,
   (G) rinsing said wire,
   (H) continuously passing said wire through a first aqueous acid solution containing an anode electrode, said anode electrode being spaced from said wire by first said solution,
   (I) continuously passing said wire through a second aqueous acid solution containing a cathode electrode, said cathode electrode being spaced from said wire by said second solution,
   (J) applying an electric current to said electrodes as said wire passes through said acid solutions whereby said wire is cathodic in said first acid solution and anodic in said second acid solution, wherein the residence time in said solution is from 2 seconds to 5 minutes,
   (K) rinsing said wire, and
   (L) drying said wire, (M) and welding with said wire to provide high quality, non-porous weld beads.

References Cited

UNITED STATES PATENTS

| | | | |
|---|---|---|---|
| 1,068,411 | 7/1913 | Chubb | 204—58 |
| 1,946,150 | 2/1934 | Tosterud | 204—58 |
| 2,376,082 | 5/1945 | Pullen | 204—29 |
| 2,671,717 | 3/1954 | Ferguson | 204—33 |
| 2,681,402 | 6/1954 | Muller | 117—202 |
| 2,703,781 | 3/1955 | Hesch | 204—29 |
| 3,079,308 | 2/1963 | Ramirez et al. | 204—28 |

HOWARD S. WILLIAMS, *Primary Examiner.*

JOHN H. MACK, *Examiner.*

T. TUFARIELLO, *Assistant Examiner.*